Jan. 13, 1970     G. H. BUELOW     3,488,955

HYDROSTATIC TRANSMISSION DRIVE PUMP SWASH PLATE CONTROL

Filed July 29, 1968

*INVENTOR.*
G. H. BUELOW

United States Patent Office 3,488,955
Patented Jan. 13, 1970

3,488,955
HYDROSTATIC TRANSMISSION DRIVE PUMP SWASH PLATE CONTROL
Gerald Herbert Buelow, Horicon, Wis., assignor to Deere & Company, Moline, Ill., a corporation of Delaware
Filed July 29, 1968, Ser. No. 748,511
Int. Cl. F16d *31/06;* F04b *47/00;* F16h *21/44*
U.S. Cl. 60—53                            7 Claims

ABSTRACT OF THE DISCLOSURE

A hydrostatic transmission drive pump swash plate control including a driven arm and a drive plate mounted for rotation about first and second parallel axes, the driven arm being linked to the swash plate to effect simultaneous movement of the arm and swash plate, linkage means operatively connecting the drive plate to an operator-control mechanism, a cam slot provided in said plate, a cam follower carried by said driven arm and engageable with said cam slot, and spring means acting against said driven arm to urge said cam follower against one side of said cam slot.

BACKGROUND OF THE INVENTION

The present invention relates generally to a control mechanism for a hydraulic pump swash plate, and more particularly to a control mechanism for a swash plate of a hydraulic pump which is incorporated as a component of a hydrostatic transmission.

In hydrostatic transmissions, it is customary to control the volume output from the drive pump and the directional flow of fluid therefrom by a swash plate which is rotatable about an axis transverse to the axis of rotation of axial displaceable pistons of a drive pump. The movement of the swash plate to either side of a neutral position is frequently controlled by a mechanical linkage which includes a manually operable lever. However, it has often been difficult to provide adequate control of the transmission with a mechanical linkage since, unless the various parts of the linkage were constructed with a high degree of tolerance, the neutral position of the swash plate was difficult to find. For example, if there is a little play in the linkage, the swash plate would not necessarily be returned to its exact neutral position when the control lever was returned to its neutral position. This would result in creepage of the vehicle provided with the transmission, even though the control lever was in a neutral position. The present invention is intended to provide a mechanical linkage which overcomes the above-noted disadvantage of prior mechanical linkages for controlling hydrostatic transmissions.

SUMMARY OF THE INVENTION

The primary object of the present invention is to provide an improved control mechanism for the drive pump swash plate of a hydrostatic transmission.

A further object of the present invention is to provide a control mechanism for the drive pump swash plate of a hydrostatic transmission, which control mechanism provides a high degree of accuracy in correlating movements of the swash plate with the movements of a manual control lever.

An additional object of the present invention is to provide a mechanical linkage including a manual control lever for tilting the drive pump swash plate to either side of a neutral position, said linkage including a biasing means which insures that the swash plate is in a neutral position whenever the control lever is in the neutral position.

The above objects and additional objects and advantages will become apparent along with the details of construction from a reading of the following description taken in conjunction with the accompanying drawing.

DESCRIPTION OF THE PREFERRED EMBODIMENTS

Figure 1:
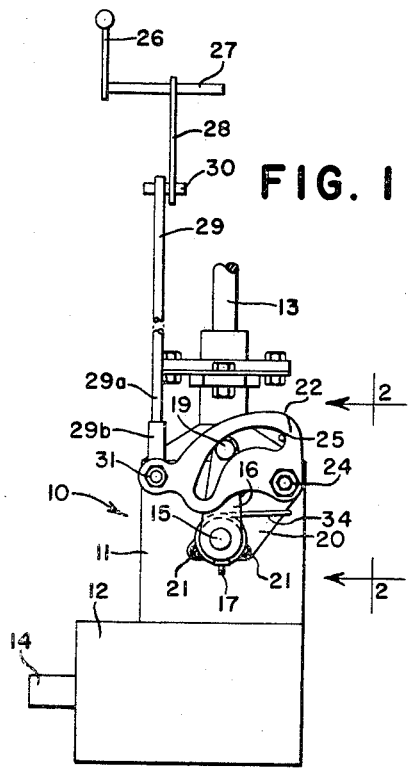
FIG. 1 is a plan view of a control mechanism constructed in accordance with the principles of the present invention, with portions thereof being shown generally schematically.
Figure 2:
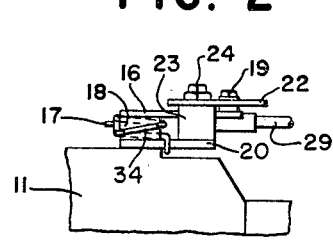
FIG. 2 is a side elevational view of a portion of the control mechanism illustrated in FIG. 1, taken in the direction of the lines 2—2 of FIG. 1.

Referring now to the drawing, and in particular to FIGS. 1 and 2, a hydrostatic transmission is indicated generally at 10, and includes a drive pump section 11 and a motor section 12. The drive pump 11, motor 12, and the fluid connections therebetween do not form a part of the present invention, but can be of any conventional structure. For example, the drive pump and motor can be constructed in the manner illustrated in U.S. Patent 3,309,870, issued Mar. 21, 1967, to Pinkerton. The drive pump 11 is driven by a prime mover (not disclosed) through a drive shaft 13 and the motor 12 is connected to vehicle wheels (not disclosed) through a driven shaft 14.

A control shaft 15 is journaled in the housing of the drive pump 11 and extends from one side thereof. The control shaft 15 is secured to the drive pump swash plate along its axis of rotation in any well-known manner, such as that disclosed in U.S. Patent 3,309,870. Therefore, by rotating the shaft 15, the drive pump swash plate can be tilted in varying degrees to either side of a neutral position to control the volume output of the drive pump and also the directional flow of fluid therefrom. A control arm 16 is carried by the shaft 15 and is fixed for rotation therewith by a pin 17 which extends through an enlarged portion 18 of the control arm 16 and the shaft 15. For reasons to be explained hereinafter, one end of the pin 17 is left projecting from the enlarged portion 18 of the control arm 16. The free end of the arm 16 is provided with a cam follower 19.

A trunnion plate 20 is positioned over the shaft 15 beneath the control arm 16, and is secured to the drive pump 11 by bolts 21. The trunnion plate 20 extends away from the shaft 15 and at its outer end carries a cam plate 22. The cam plate 22 is rotatably mounted on the trunnion plate 20 by a bolt 24 which extends through an apertured enlarged portion 23 of the cam plate and into the extended end of the trunnion plate 20. The enlarged portion 23 of the cam plate 22 journals the cam plate 22 on the trunnion plate 20 and also raises the cam plate 22 a sufficient distance to lie above the control arm 16. The cam plate 22 is also provided with an elongated arcuate slot 25 which receives the cam follower 19. The slot 25 is shaped and positioned so that as the cam plate 22 is rotated about the bolt 24, the walls of the slot 25 will engage the cam follower 19 and move the control arm 16 between two extreme positions on either side of a neutral position.

Movements of the cam plate 22 can be controlled by an operator through a hand lever 26 which is fixed to a rockshaft 27. The rockshaft 27 carries a depending crank arm 28 which in turn is pivotally connected to one end of an elongated rod 29 by pivot pin 30. The rod 29 is then connected to the cam plate 22 by a bolt 31 at a point remote from the mounting of the cam plate 22 on the trunnion plate 20 so that as the rod 29 is moved back and forth by movement of the hand lever 26, the cam plate 22 will be rotated back and forth about the bolt 24. The rod 29 is made of two sections 29a and 29b, with the section 29a being threadedly received by the hollow section 29b so that initial adjustment of the length of the rod 29 can be made. As can be seen from FIG. 3, the manual control lever 26 is movable along a quadrant 32 which is fixed to any suitable structure of a vehicle with which the transmission is used. At approximately its center, the quadrant 32 is recessed as at 33 to receive the control lever 26 whenever the lever 26 is in its neutral position. The recess 33 in the quadrant 32 aids an operator in finding the neutral position of the control lever 26 and also maintains the control lever 26 in the neutral position.

From the above description, it can be seen that as the control lever 26 is moved forwardly, the cam plate 22 will be rotated about the bolt 24 and the cam slot 25 will act against the cam follower 19 to ultimately move the drive pump swash plate away from a neutral position. The amount of movement of the control lever 26 will also determine the amount of movement of the drive pump swash plate. If the control lever 26 is moved rearwardly from its neutral position, the cam plate 22 will be moved in the opposite direction so that the cam slot 25 will act against the cam follower 19 to ultimately move the swash plate in the opposite direction.

As can be seen from an examination of FIG. 1, as the direction of movement of the lever 26 is reversed, the cam follower 19 will move from one side of the cam slot 25 to the other side of the cam slot 25. For example, as the lever 26 is moved forwardly, the cam plate 22 will be moved counterclockwise about the bolt 24 and the side of the cam slot 25 which is remote from the bolt 24 will engage the cam follower 19. As the lever 26 is moved rearwardly, the cam plate 22 will revolve clockwise about the bolt 24 and the cam follower 19 will be engaged by the side of the slot 25 which is adjacent to the bolt 24.

If the cam slot 25 and the cam follower 19 are not manufactured with a high degree of tolerance with respect to one another or if these parts have begun to wear, the cam follower will be capable of moving between the sides of the slot 25 and will hunt between the two sides of the cam slot and make it very difficult to establish a neutral position. However, the hunting of the cam follower 19 between the two sides of the cam slot 25 can be alleviated by providing a bias on the control arm 16 which will urge the cam follower 19 against one side of the cam slot 25. In the embodiment illustrated in FIG. 1, a bias is provided on the control arm 16 by the torsion spring 34. One end of the torsion spring 34 is hooked about the projecting end of the pin 17, the body of the spring 34 is wrapped about the enlarged portion 18 of the control arm 16, and the other end of the spring 34 is hooked over the trunnion plate 20. The natural tendency of the torsion spring 34 to straighten will bias the control arm 16 in a clockwise direction as viewed in FIG. 1 and urge the cam follower 19 against the side of the slot 25 which is adjacent to the bolt 24. With the spring 34 maintaining the cam follower 19 against a single side of the cam slot 25, the neutral position of the drive pump swash plate will be established whenever the control lever 26 is moved to a single predetermined position, and the single predetermined position of the control lever 26 can be made to correspond to the recess 33 in the quadrant 32 by lengthening or shortening the control rod 29 as previously explained.

Figure 3:
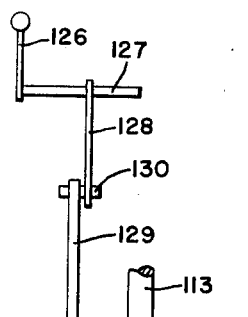
FIG. 3 is a perspective view of a portion of the control mechanism.
Figure 4:
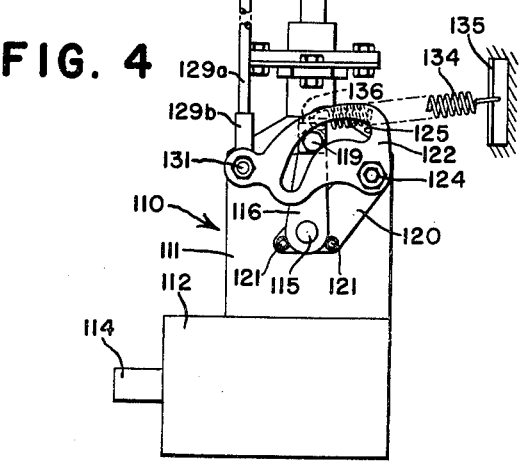
FIG. 4 is a plan view similar to FIG. 1, but illustrating a slightly modified form of the control mechanism.

Referring now to FIG. 4 wherein the second embodiment of the invention is illustrated, a hydrostatic transmission assembly is indicated generally at 110 and includes a drive pump section 111 and a motor section 112. The drive pump of the hydrostatic transmission is driven by a prime mover (not disclosed) through a drive shaft 113 and the motor of the hydrostatic transmission is connected to the driven wheels (not disclosed) of a vehicle through the driven shaft 114. As in the embodiment described in FIGS. 1, 2, and 3, the drive pump swash plate of the embodiment illustrated in FIG. 4 is controlled by rotation of the control shaft 115, and the movements of the control shaft are dictated by the control arm 116 which is carried by and secured to the shaft 115 for rotation therewith. The free end of the control arm carries the cam follower 119. A trunnion plate 120 is positioned over the shaft 115 and is secured to the drive pump section 111 by bolts 121. The trunnion plate 120 projects away from the shaft 115 and carries a cam plate 122 at its projecting end. The cam plate 122 is rotatably mounted on the projecting end of the trunnion plate 120 by a bolt 124 and is provided with an elongated arcuate-shaped cam slot 125 which receives the cam follower 119. The movements of the cam plate 122 are controlled by a mechanical linkage which includes a control lever 126 fixed to a rockshaft 127, a crank arm 128 fixed to and depending from the rockshaft 127, and an elongated rod 129 which is pivotally secured to the crank arm 128 by a pivot pin 130 and is fixed to the cam plate 122 by a bolt 131. The rod 129 is formed from two pieces 129a and 129b, with the section 129a being threadedly received by the hollow section 129b so that the length of the rod 129 can be adjusted by withdrawing the pivot pin 130 and threading the section 129a into or out of the secton 129b.

The hydrostatic transmission unit and the controls therefor thus far described with reference to FIG. 4 are identical in construction and operation to the hydrostatic transmission and controls described and illustrated in FIGS. 1–3. The hydrostatic transmission unit and controls illustrated in FIG. 4 differ from that illustrated in FIGS. 1–3 in that the cam follower 119 is biased into engagement with one side of the cam slot 125 by a simple tension spring 134. The tension spring 134 acts between a clip 136 fixed to the free end of the control arm 116 and an anchor member 135 which is fixed to any suitable part of the vehicle structure with which the transmission unit will be used. The spring 134 urges the control arm 116 in a clockwise direction as viewed in FIG. 4 and biases the cam follower 119 against the side of the cam slot 125 which is adjacent to the mounting bolt 124.

The tension spring 134 performs the same function as the torsion spring 34 described with reference to FIGS. 1–3, and specifically, functions to urge the cam follower 119 against one side of the cam slot 125 to prevent the cam follower 119 from hunting between the two sides of the cam slot 125 so that the neutral position of the drive pump swash plate will be established whenever the control lever 126 is moved to its neutral position.

I claim:

1. In combination with a vehicle having a hydrostatic transmission including a drive pump, a motor, and a swash plate tiltable to either side of a neutral position to vary the transmission ratio between said pump and motor and to change the direction of rotation of said motor with respect to the direction of rotation of said pump, means for controlling the movements of said swash plate, said means comprising: first and second members mounted for rotation about first and second parallel axes, a cam follower and cam means on said first and second members, means linking said first member to said swash plate to transmit the movements of said first member to said swash plate, means linking said second member to a manual control mechanism mounted on said vehicle, and means biasing said cam follower against said cam means.

2. The combination as set forth in claim 1 wherein said cam means consists of a generally arcuate-shaped, elongated slot provided in said second member at a position spaced from the axis of rotation thereof, said cam follower extends through said slot, and said biasing means urges said cam follower against a single side of said slot.

3. The combination as set forth in claim 2 wherein said biasing means comprises a tension spring acting between said first member and an anchor on said vehicle to rotate said arm in a direction to bring said cam follower into engagement with said single side of said slot.

4. The combination as set forth in claim 2 wherein said first member is carried by a shaft journaled along said first axis and is secured thereto for rotation therewith, said biasing means comprises a torsion spring having one end secured to said first member, the main body portion encircling said shaft, and the other end thereof secured to an anchor member on said transmission.

5. In combination with a hydrostatic transmission having a drive pump with a swash plate tiltable about an axis to either side of a neutral position to vary the volume output of said pump and to vary the direction of fluid flow from said pump, means for controlling the movements of said swash plate, said means comprising: a control arm and a cam plate mounted for rotation about spaced parallel axes; a cam follower and cam surface on said control arm and said cam plate, respectively; said cam follower and cam surface being positioned and arranged to engage and cause rotation of said control arm upon rotation of said cam plate; a manual control mechanism and means linking said mechanism to said cam plate to cause rotation of said cam plate upon movement of said manual control mechanism; means linking said control arm to said swash plate to cause tilting movement thereof upon rotation of said control arm; and means biasing said cam follower into engagement with said cam surface.

6. The combination as set forth in claim 5 wherein said swash plate is tiltable and said control arm is rotatable about a common axis; said means linking said control arm to said swash plate comprises a shaft mounted for rotation along said common axis, fixed to said swash plate, and carrying said control arm; and said biasing means includes a torsion spring encircling said shaft and having its ends fixed to said control arm and an anchor member on said transmission.

7. The combination as set forth in claim 6 wherein said cam surface comprises an elongated generally arcuate-shaped slot provided in said cam plate at a position spaced from the axis of rotation of said cam plate and with its ends being spaced unequal distances from the axis of rotation of said cam plate; and said torsion spring urges said cam follower against one side of said slot to prevent said cam follower from hunting between the two sides of said slot.

References Cited

UNITED STATES PATENTS

| 3,013,437 | 12/1961 | Harding | 74—96 |
| 3,309,870 | 3/1967 | Pinkerton. | |
| 3,374,626 | 3/1968 | Catuara et al. | |
| 3,401,522 | 9/1968 | Hann et al. | |

EDGAR W. GEOGHEGAN, Primary Examiner

U.S. Cl. X.R.

74—96; 103—38